(12) United States Patent
Kakuda et al.

(10) Patent No.: US 10,894,745 B2
(45) Date of Patent: *Jan. 19, 2021

(54) FERRITE COMPOSITION, FERRITE SINTERED BODY, ELECTRONIC DEVICE, AND CHIP COIL

(71) Applicant: TDK CORPORATION, Tokyo (JP)

(72) Inventors: Kouichi Kakuda, Tokyo (JP); Ryuichi Wada, Tokyo (JP); Yukio Takahashi, Tokyo (JP); Hiroyuki Tanoue, Tokyo (JP); Tatsuro Suzuki, Tokyo (JP); Takahiro Sato, Tokyo (JP); Takashi Suzuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 230 days.

This patent is subject to a terminal disclaimer.

(21) Appl. No.: 15/678,775

(22) Filed: Aug. 16, 2017

(65) Prior Publication Data

US 2018/0057408 A1 Mar. 1, 2018

(30) Foreign Application Priority Data

Aug. 30, 2016 (JP) ................................ 2016-168160

(51) Int. Cl.
*H01F 1/34* (2006.01)
*H01F 17/04* (2006.01)
*H01F 41/02* (2006.01)
*C04B 35/26* (2006.01)
*C01G 53/00* (2006.01)
*H01F 17/00* (2006.01)

(52) U.S. Cl.
CPC .......... *C04B 35/265* (2013.01); *C01G 53/006* (2013.01); *H01F 1/344* (2013.01);
(Continued)

(58) Field of Classification Search
CPC ...... H01F 1/344; H01F 17/04; H01F 17/0013; H01F 41/0246; H01F 27/027; C04B 35/265; C01P 2006/42
(Continued)

(56) References Cited

U.S. PATENT DOCUMENTS 6,287,479 B1  9/2001  Tanaka
9,984,799 B2 *  5/2018  Wada ........................ H01F 1/01
(Continued)

FOREIGN PATENT DOCUMENTS

JP   H01-101609 A   4/1989
JP   H02-137301 A   5/1990
(Continued)

*Primary Examiner* — Matthew E. Hoban
*Assistant Examiner* — Lynne Edmondson
(74) *Attorney, Agent, or Firm* — Oliff PLC

(57) ABSTRACT

A ferrite composition includes a main component and an accessory component. The main component includes 43.0 to 51.0 mol % of iron oxide in terms of $Fe_2O_3$, 5.0 to 15.0 mol % of copper oxide in terms of CuO, 1.0 to 24.9 mol % of zinc oxide in terms of ZnO, and a remaining part of nickel oxide. The accessory component includes 0.2 to 3.0 pts. wt. of silicon compound in terms of $SiO_2$, 3.0 to 8.0 pts. wt. of cobalt compound in terms of $Co_3O_4$ (excluding 3.0 pts. wt.), and 0.2 to 8.0 pts. wt. of bismuth compound in terms of $Bi_2O_3$ with respect to 100 pts. wt. of the main component.

12 Claims, 2 Drawing Sheets

(52) U.S. Cl.
CPC ......... *H01F 17/0013* (2013.01); *H01F 17/04* (2013.01); *H01F 41/0246* (2013.01); *C01P 2006/40* (2013.01); *C04B 2235/3277* (2013.01); *C04B 2235/3279* (2013.01); *C04B 2235/3281* (2013.01); *C04B 2235/3284* (2013.01); *C04B 2235/3298* (2013.01); *C04B 2235/3418* (2013.01); *C04B 2235/5445* (2013.01)

(58) Field of Classification Search
USPC ................. 252/62.59, 62.6, 62.56, 62.62
See application file for complete search history.

(56) References Cited

U.S. PATENT DOCUMENTS

| | | | |
|---|---|---|---|
| 10,020,791 B2* | 7/2018 | Kakuda | ............... H03H 7/0115 |
| 10,074,476 B2* | 9/2018 | Choto | .................... H01F 1/344 |
| 2002/0158737 A1 | 10/2002 | Yokoyama | |
| 2008/0296528 A1 | 12/2008 | Sutoh et al. | |
| 2015/0097137 A1* | 4/2015 | Wada | ....................... H01F 1/01 252/62.6 |

FOREIGN PATENT DOCUMENTS

| | | |
|---|---|---|
| JP | H03-93667 A | 4/1991 |
| JP | H03-218962 A | 9/1991 |
| JP | H08-231268 A | 9/1996 |
| JP | H09-295862 A | 11/1997 |
| JP | 2000-252112 A | 9/2000 |
| JP | 2002-075722 A | 3/2002 |
| JP | 2002-134312 A | 5/2002 |
| JP | 2002-141216 A | 5/2002 |
| JP | 2006-206347 A | 8/2006 |
| JP | 2008-300548 A | 12/2008 |
| KR | 10-2015-0040764 A | 4/2015 |

* cited by examiner

FERRITE COMPOSITION, FERRITE SINTERED BODY, ELECTRONIC DEVICE, AND CHIP COIL

BACKGROUND OF THE INVENTION

1. Field of the Invention

The present invention relates to a ferrite composition, a ferrite sintered body, an electronic device, and a chip coil.

2. Description of the Related Art

A frequency band used for mobile phones, PCs, and the like has recently become higher, and there has been already a plurality of standards of several GHz. Products for noise removal corresponding to signals of such high frequencies are required. Chip coils are a representative example of the products.

Chip coils favorably used in various environments are currently required, and chip coils having favorable temperature characteristics and electric characteristics are particularly required.

Electric characteristics of the chip coils can be evaluated by impedance. Impedance characteristics of the chip coils are largely affected by permeability of materials of an element body and frequency properties of an element body. Moreover, when improving a real part $\mu'$ of complex permeability of an element body particularly at high frequencies, impedance characteristics are improved, and noise removal performances of the chip coils are further improved.

According to the Snoek's limit, however, permeability normally becomes lower as frequency becomes higher, and a real part $\mu'$ of complex permeability is decreased. Thus, it is difficult to improve impedance characteristics of chip coils and noise removal performances particularly at high frequencies.

Incidentally, the Snoek's limit is expressed by Formula (1) shown below. In Formula (1), $f_r$ is a rotating magnetization resonance frequency, $\mu_i$ is an initial permeability, $\gamma$ is a gyro magnetic constant, and $M_s$ is a saturation magnetization.

$$f_r(\mu_i - 1) = |\gamma| \times (M_s/3\pi) \quad \text{Formula (1)}$$

It is currently often the case that Ni—Cu—Zn based ferrites are used as an element body material of the chip coils. The reason why Ni—Cu—Zn based ferrites are often used is that Ni—Cu—Zn based ferrites are a magnetic body ceramic capable of being fired at about 900° C. Since Ni—Cu—Zn based ferrites can be fired at about 900° C., Ni—Cu—Zn based ferrites can be fired simultaneously with Ag, which is used as an internal electrode.

When an additive is added to an element body material, it is known that permeability is maintained to a high frequency equal to or higher than the Snoek's limit, or on the contrary, permeability is decreased at a low frequency equal to or lower than the Snoek's limit. Then, Ni—Cu—Zn ferrites containing cobalt have been proposed for years. A method for improving magnetic anisotropy, frequency characteristics of permeability, and permeability at high frequencies by adding cobalt to Ni—Cu—Zn ferrites is considered.

In Patent Document 1, a bismuth compound, such as bismuth oxide, is added to a NiCuZn ferrite along with a cobalt compound. Furthermore, Patent Document 1 attempts to improve temperature characteristics by adding a zirconium compound.

Patent Document 2 attempts to obtain favorable temperature characteristics or so by adding $Co_3O_4$, $SiO_2$, and $Bi_2O_3$ to a NiCuZn ferrite.

Patent Document 3 attempts to obtain an ferrite composition excelling in frequency characteristics by comparatively decreasing amounts of $Fe_2O_3$ and ZnO in a NiCuZn ferrite and further adding CoO thereto.

However, Examples of Patent Document 1 fail to disclose how high frequency a value of permeability is maintained to. Patent Document 1 discloses ratios of an initial permeability at 20° C. to an initial permeability at 85° C. with respect to temperature change in permeability when a zirconium oxide is added, but the smallest ratio among the ratios of an initial permeability at 20° C. to an initial permeability at 85° C. in Examples of Patent Document 1 is 1.45. This result is too large for prevention of change in initial permeability with respect to temperature change.

In Patent Document 2, no value of initial permeability is disclosed, and frequency characteristics are unclear. In Patent Document 3, temperature characteristics are unclear.

In Patent Documents 1 to 3, it is accordingly unclear that the NiCuZn ferrites have favorable frequency characteristics and temperature characteristics.

Patent Document 1: JP 2000-252112 A
Patent Document 2: JP 2006-206347 A
Patent Document 3: JP 2008-300548 A

SUMMARY OF THE INVENTION

The prevent invention has been achieved under such circumstances. It is an object of the invention to obtain a ferrite composition constituting a ferrite sintered body favorably used for chip coils. The ferrite sintered body favorably used for chip coils is specifically a ferrite sintered body having favorable temperature characteristics and a large real part $\mu'$ of complex permeability.

To achieve the above object, the ferrite composition according to the present invention is a ferrite composition including a main component and an accessory component, wherein the main component includes:
43.0 to 51.0 mol % of iron oxide in terms of $Fe_2O_3$;
5.0 to 15.0 mol % of copper oxide in terms of CuO;
1.0 to 24.9 mol % of zinc oxide in terms of ZnO; and
a remaining part of nickel oxide, and
the accessory component includes:
0.2 to 3.0 pts. wt. of silicon compound in terms of $SiO_2$;
3.0 to 8.0 pts. wt. of cobalt compound in terms of $Co_3O_4$ (excluding 3.0 pts. wt.); and
0.2 to 8.0 pts. wt. of bismuth compound in terms of $Bi_2O_3$ with respect to 100 pts. wt. of the main component.

A ferrite sintered body according to the present invention is composed of the above ferrite composition.

An electronic device according to the present invention includes the above ferrite sintered body.

A chip coil according to the present invention includes the above ferrite sintered body.

In the ferrite sintered body according to the present invention, the oxides constituting the main component are contained in the above ranges, silicon oxide, cobalt oxide, and oxide bismuth as the accessory component are contained in the above ranges, and whereby temperature characteristics of initial permeability $\mu_i$ become favorable. Thus, the electronic device using the ferrite sintered body according to the present invention, particularly the chip coil, can be used favorably in various temperature environments.

Moreover, in the ferrite sintered body according to the present invention, a real part μ' of complex permeability particularly at high frequencies may be a large value exceeding the Snoek's limit. As a result, the chip coil using the ferrite sintered body has a high impedance particularly at high frequencies and a remarkably improved noise removal effect.

It is conceived that such an effect arises from multiple reasons, such as setting the main component to the predetermined range and further setting the contents of each constituent to the predetermined ranges.

The ferrite sintered body constituted by the ferrite composition according to the present invention is particularly favorably used for the chip coil, but may be used for the other electronic devices.

DESCRIPTION OF THE PREFERRED EMBODIMENTS

Hereinafter, the present invention will be described based on embodiments shown in the figures.

Figure 1:
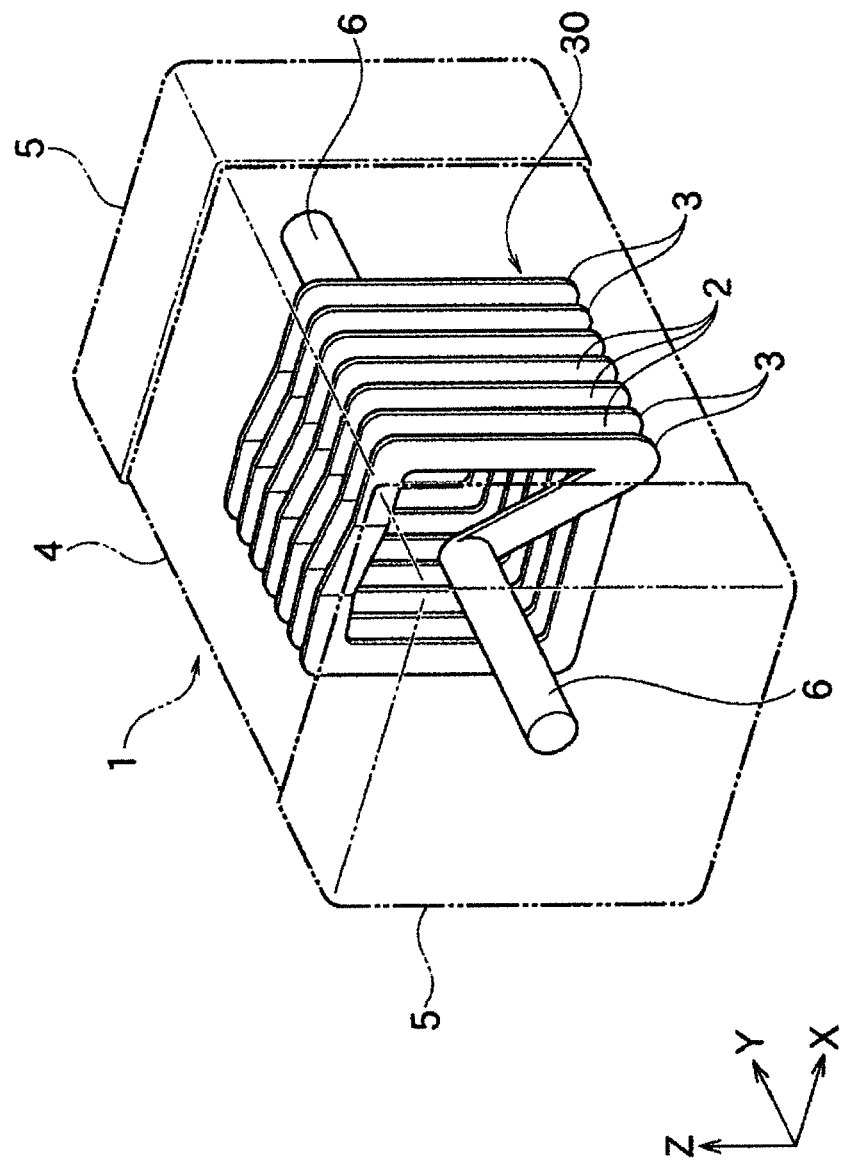
FIG. 1 is an internally transparent perspective view of a chip coil as an electronic device according to an embodiment of the present invention.

As shown in FIG. 1, a chip coil 1 as an electronic device according to an embodiment of the present invention has a chip body 4 where ceramic layers 2 and internal electrode layers 3 are laminated alternately in the Y-axis direction.

A coil conductor 30 is constituted in such a manner that each of the internal electrode layers 3 has a square ring, a C shape, or a U shape and is connected spirally by an internal electrode connection through-hole electrode (not shown) going through adjacent ceramic layers 2 or a stepped electrode.

Both ends of the chip body 4 in the Y-axis direction are respectively provided with a terminal electrode 5 and 5. Each of the terminal electrodes 5 is connected with an end of a terminal connection through-hole electrode 6 going through the laminated ceramic layers 2. The terminal electrodes 5 are connected with both ends of the coil conductor 30 constituting a closed magnetic path coil (winding pattern).

In the present embodiment, the ceramic layers 2 and the internal electrode layers 3 have a lamination direction corresponding to the Y-axis, and the terminal electrodes 5 and 5 have an end surface parallel to the X-axis and the Z-axis. The X-axis, the Y-axis, and the Z-axis are vertical to each other. In the chip coil 1 shown in FIG. 1, the coil conductor 30 has a winding axis approximately corresponding to the Y-axis.

The chip body 4 has any outer shape and size appropriately determined based on its use, and normally has an almost rectangular parallelepiped outer shape having an X-axis length of 0.15 to 0.8 mm, a Y-axis length of 0.3 to 1.6 mm, and a Z-axis length of 0.1 to 1.0 mm, for example.

The ceramic layers 2 have any thickness between electrodes and any base thickness, and may have a thickness between electrodes (a distance between the internal electrode layers 3 and 3) of about 3 to 50 μm and a base thickness (a length of the terminal connection through-hole electrode 6 in the Y-axis direction) of about 5 to 300 μm.

In the present embodiment, the terminal electrodes 5 are not limited, and formed in such a manner that a conductive paste containing a main component of Ag, Pd, etc. is adhered to an outer surface of the body 4, baked, and electrically plated using Cu, Ni, Sn, etc.

The coil conductor 30 contains Ag (including an alloy of Ag), and is constituted by a simple substance of Ag, an Ag—Pd alloy, or the like. The coil conductor 30 may contain Zr, Fe, Mn, Ti, and an alloy thereof as an accessory component.

The ceramic layers 2 are composed of a ferrite composition according to an embodiment of the present invention. Hereinafter, the ferrite composition will be described in detail.

The ferrite composition according to the present embodiment contains a main component of iron oxide, copper oxide, zinc oxide, and nickel oxide.

In 100 mol % of the main component, a content of iron oxide is 43.0 to 51.0 mol %, preferably 46.1 to 51.0 mol %, more preferably 46.1 to 50.0 mol %, in terms of $Fe_2O_3$. When a content of iron oxide is too small, a real part μ' of complex permeability tends to decrease. When a content of iron oxide is too large, sinterability deteriorates, and resistivity tends to decrease due to the deterioration of sinterability.

In 100 mol % of the main component, a content of copper oxide is 5.0 to 15.0 mol %, preferably 5.0 to 12.0 mol %, more preferably 5.5 to 11.0 mol %, in terms of CuO. When a content of copper oxide is too small, sinterability deteriorates, and resistivity tends to decrease due to the deterioration of sinterability. When a content of copper oxide is too large, temperature characteristics of initial permeability $μ_i$ tend to deteriorate.

In 100 mol % of the main component, a content of zinc oxide is 1.0 to 24.9 mol %, preferably 2.0 to 22.0 mol %, more preferably 2.0 to 17.0 mol %, in terms of ZnO. When a content of zinc oxide is too small, a real part μ' of complex permeability tends to decrease. When a content of zinc oxide is too large, a real part μ' of complex permeability at high frequencies around 900 MHz tends to decrease, and temperature characteristics of initial permeability $μ_i$ tend to deteriorate.

The main component has a remaining part composed of nickel oxide.

In addition to the above main component, the ferrite composition according to the present embodiment contains an accessory component of silicon oxide, cobalt oxide, and bismuth oxide.

With respect to 100 mol % of the main component, a content of silicon oxide is 0.2 to 3.0 pts. wt., preferably 0.2 to 2.2 pts. wt., more preferably 0.20 to 2.0 pts. wt., in terms of $SiO_2$. When a content of silicon oxide is too small, temperature characteristics of initial permeability $μ_i$ tend to deteriorate. When a content of silicon oxide is too large, a real part μ' of complex permeability at high frequencies around 900 MHz tends to decrease.

With respect to 100 mol % of the main component, a content of cobalt oxide is 3.0 to 8.0 pts. wt. (excluding 3.0 pts. wt.), preferably 3.1 to 8.0 pts. wt., more preferably 3.1 to 7.0 pts. wt., in terms of $Co_3O_4$. When a content of cobalt oxide is too small, a real part μ' of complex permeability at high frequencies around 900 MHz tends to decrease. When a content of cobalt oxide is too large, a real part μ' of complex permeability tends to decrease, and temperature characteristics of initial permeability $μ_i$ tend to deteriorate.

With respect to 100 mol % of the main component, a content of bismuth oxide is 0.2 to 8.0 pts. wt., preferably 0.3 to 8.0 pts. wt., more preferably 0.30 to 5.0 pts. wt., in terms of $Bi_2O_3$. When a content of bismuth oxide is too small, sinterability deteriorates, and resistivity tends to decrease due to the deterioration of sinterability. When a content of bismuth oxide is too large, bismuth oxide may ooze out during firing, which is unfavorable because characteristics of the chip coil vary largely between when bismuth oxide oozes out and when bismuth oxide does not ooze out. Furthermore, when manufacturing a large amount of electronic devices with a ferrite composition containing too much bismuth compound, a plurality of the electronic devices may be connected with each other due to oozing of bismuth oxide, or the electronic devices may be adhered to a setter where the electronic devices are mounted.

Incidentally, in the manufacture of dielectric ceramic compositions, contents of each constituent of the main component and the accessory component hardly change in each step from raw material powders to firing.

In the ferrite composition according to the present embodiment, the main component has compositions controlled in the above ranges, and the accessory component contains silicon oxide, cobalt oxide, and bismuth oxide in the above ranges. As a result, a ferrite composition whose sinterability and resistivity p after sintering are high is obtained. The ferrite sintered body composed of the ferrite composition according to the present embodiment has favorable temperature characteristics of initial permeability $\mu_i$.

Moreover, a real part $\mu'$ of complex permeability, particularly a real part $\mu'$ of complex permeability at high frequencies around 900 MHz, is large in the ferrite sintered body composed of the ferrite composition according to the present embodiment. In the ferrite sintered body, a real part $\mu'$ of complex permeability is large, and chip coils using the ferrite sintered body thus have a large impedance. Moreover, a real part $\mu'$ of complex permeability, particularly at high frequencies around 900 MHz, is large, and a large impedance is thus obtained particularly at high frequencies.

As a result, the chip coils using the ferrite sintered body composed of the ferrite composition according to the present embodiment have a high resistivity due to excellent sinterability of the ferrite composition, and can be sintered at a low temperature of about 900° C. (950° C. or lower), which is equal to or lower than the melting point of Ag, which can be used as an internal electrode. The chip coils using the ferrite sintered body composed of the ferrite composition according to the present embodiment have excellent temperature characteristics and a large noise removal effect particularly at high frequencies.

In addition to the above accessory component, the ferrite composition according to the present embodiment may contain an additional component of manganese oxide, such as $Mn_3O_4$, zirconium oxide, tin oxide, magnesium oxide, glass compound, and the like within a range where the effect of the present invention is not disturbed. The contents of these additional constituents are not limited, and are about 0.05 to 1.0 pts. wt., for example.

Moreover, the ferrite composition according to the present embodiment may contain oxides of elements of inevitable impurities.

Specifically, examples of the elements of inevitable impurities include C, S, Cl, As, Se, Br, Te, and I, typical metal elements of Li, Na, Mg, Al, Ca, Ga, Ge, Sr, Cd, In, Sb, Ba, and Pb, and transition metal elements of Sc, Ti, V, Cr, Y, Nb, Mo, Pd, Ag, Hf, and Ta. The ferrite composition according to the present embodiment may contain oxides of the elements of inevitable impurities if the content of the oxides is about 0.05 pts. wt. or less.

Preferably, crystal particles of the ferrite composition according to the present embodiment have an average crystal particle size of 0.2 to 1.5 μm.

Next, a manufacturing method of the ferrite composition according to the present embodiment will be described. First, starting materials (raw materials of the main component and raw materials of the accessory component) are weighed at a predetermined composition ratio and mixed, and a raw material mixture is obtained. The starting materials are mixed by a wet mixing using a ball mill, a dry mixing using a dry mixer, or the like. Incidentally, the starting materials preferably have an average particle size of 0.05 to 1.0 μm.

The raw materials of the main component include iron oxide ($\alpha$-$Fe_2O_3$), copper oxide (CuO), nickel oxide (NiO), zinc oxide (ZnO), composite oxide, and the like. Moreover, various kinds of compounds to be the above-mentioned oxides or composite oxide by firing may be used. Examples of the above-mentioned oxides by firing include metal simple substance, carbonate, oxalate, nitrate, hydroxide, halide, and organometallic compound.

The raw materials of the accessory component include silicon oxide, cobalt oxide, and bismuth oxide. Any oxide, such as composite oxide, to be the raw materials of the accessory component may be used. Moreover, various kinds of compounds to be the above-mentioned oxides or composite oxide by firing may be used. Examples of the above-mentioned oxides by firing include metal simple substance, carbonate, oxalate, nitrate, hydroxide, halide, and organometallic compound.

Incidentally, $Co_3O_4$, which is a form of cobalt oxide, is preferable as a raw material of cobalt oxide because $Co_3O_4$ is easy to be stored and handled and has a stable valence even in the air.

Next, the raw material mixture is calcined, and a calcined material is obtained. The calcination causes pyrolysis of the raw materials, homogenization of the components, formation of the ferrite, disappearance of ultrafine particles by sintering, and grain growth to moderate particle size, and is performed for conversion of the raw material mixture into a formation suitable to post processes. There is no limit to calcination time and calcination temperature. The calcination may be conducted in an atmosphere whose oxygen partial pressure is lower than that of the air, although calcination is normally conducted in the air.

Next, the calcined material is pulverized, and a pulverized material is obtained. This pulverization is conducted for breaking down aggregation of the calcined material and turning it into a powder having an appropriate sinterability. When the calcined material has a large mass, a coarse pulverization is conducted, and a wet pulverization is then conducted using a ball mill, an attritor, or the like. This wet pulverization is conducted until the pulverized material has preferably an average particle size of about 0.1 to 1.0 μm.

Incidentally, the calcination is conducted after all of the powders of the main component and the powders of the accessory component are mixed in the above-mentioned manufacturing method of the pulverized material, but the manufacturing method of the pulverized material is not limited to the above-mentioned manufacturing method. For example, a part of the raw material powders mixed before the calcination may be mixed at the time of pulverization of the calcined material after the calcination instead of being mixed with the rest of the raw material powders before the calcination.

Next, the chip coil 1 shown in FIG. 1 according to the present embodiment is manufactured using the obtained pulverized material.

First, the obtained pulverized powder is turned into a slurry along with a solvent and an additive of a binder or so to prepare a ferrite paste. Thereafter, the obtained ferrite paste is printed and laminated alternately with an internal electrode paste containing Ag or so and is then fired, and the chip body 4 can be formed (printing method). Instead, the chip body 4 may be formed by manufacturing green sheets using the ferrite paste, printing an internal electrode paste on the surfaces of the green sheets, and laminating and firing them (sheet method). In any case, the terminal electrodes 5 are formed by baking, plating, or the like after the chip body 4 is formed.

There is no limit to contents of the binder and the solvent in the ferrite paste. For example, the content of the binder can be determined in a range of about 1 to 10 wt. %, and the content of the solvent can be determined in a range of about 10 to 50 wt. %. If necessary, the paste may contain 10 wt. % or less of a dispersant, a plasticizer, and the like. The internal electrode paste containing Ag etc. may be manufactured in a similar manner. The firing is conducted in any conditions, but is conducted preferably at 930° C. or less, more preferably at 900° C. or less, when the internal electrode layers contain Ag etc.

Incidentally, the present invention is not limited the above-mentioned embodiment, and may be variously changed within the scope of the present invention.

Figure 2:
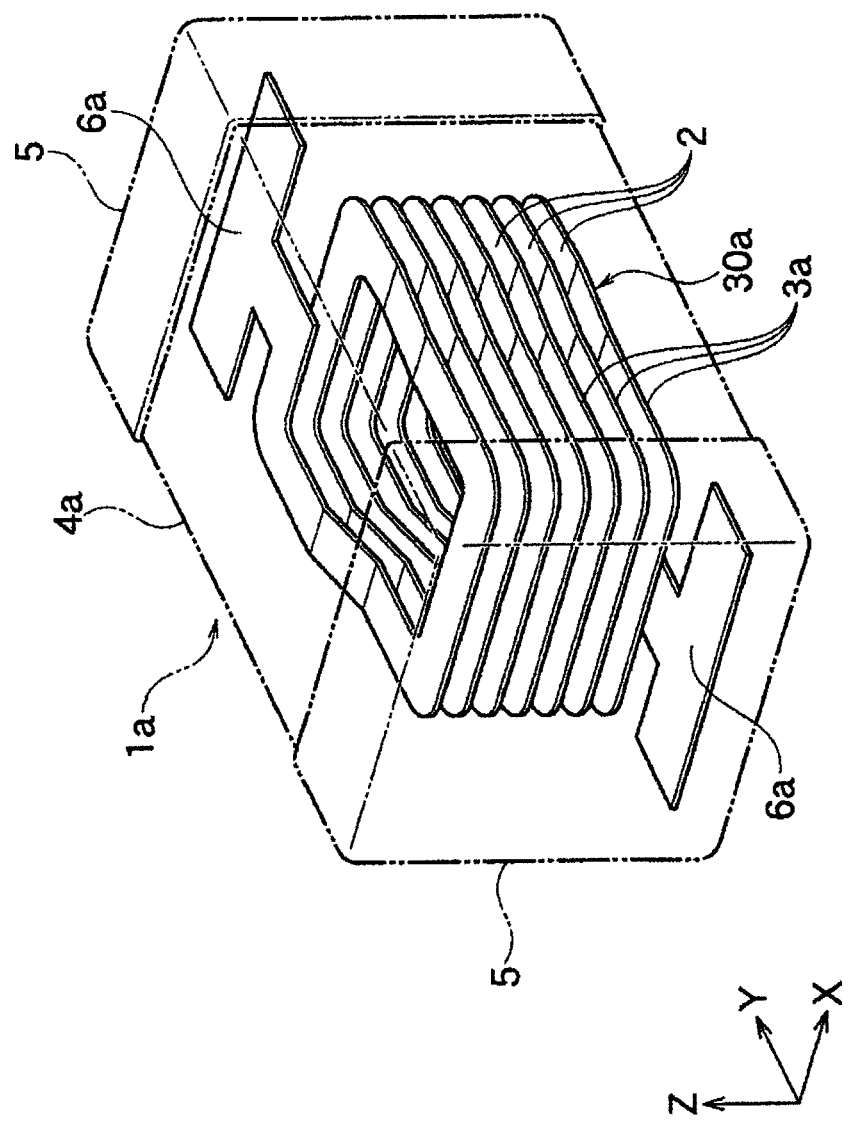
FIG. 2 is an internally transparent perspective view of a chip coil as an electronic device according to another embodiment of the present invention.

For example, ceramic layers 2 of a chip coil 1a shown in FIG. 2 may be constituted using the ferrite composition of the above-mentioned embodiment. The chip coil 1a shown in FIG. 2 has a chip body 4a where the ceramic layers 2 and internal electrode layers 3a are laminated alternately in the Z-axis direction.

A coil conductor 30a is constituted in such a manner that each of the internal electrode layers 3a has a square ring, a C shape, or a U shape and is connected spirally by an internal electrode connection through-hole electrode (not shown) going through adjacent ceramic layers 2 or a stepped electrode.

Both ends of the chip body 4a in the Y-axis direction are respectively provided with a terminal electrode 5 and 5. Each of the terminal electrodes 5 and 5 is connected with an end of a leading electrode 6a positioned top and bottom in Z-axis direction. The terminal electrodes 5 and 5 are connected with both ends of a coil conductor 30a constituting a closed magnetic path coil.

In the present embodiment, the ceramic layers 2 and the internal electrode layers 3 have a lamination direction corresponding to the Z-axis, and the terminal electrodes 5 and 5 have an end surface parallel to the X-axis and the Z-axis. The X-axis, the Y-axis, and the Z-axis are vertical to each other. In the chip coil 1a shown in FIG. 2, the coil conductor 30a has a winding axis approximately corresponding to the Z-axis.

In the chip coil 1 shown in FIG. 1, the coil conductor 30 has a winding axis in the Y-axis direction, which is the longitudinal direction of the chip body 4, and it is thus possible to increase the number of turns, compared to the chip coil 1a shown in FIG. 2. Then, the chip coil 1 shown in FIG. 1 is advantageous in that high impedance to high frequency band is obtained easily. In the chip coil 1a shown in FIG. 2, the other structure and effect are similar to those of the chip coil 1 shown in FIG. 1.

Moreover, the ferrite composition according to the present embodiment may be used for electronic devices other than the chip coil shown in FIG. 1 or FIG. 2. For example, the ferrite composition according to the present embodiment may be used as ceramic layers laminated with a coil conductor. The chip coil is not necessarily a multilayer chip coil, and the ferrite composition according to the present embodiment may be used for a winding type chip coil. In addition, the ferrite composition according to the present embodiment may be used for a composite electronic device combining a coil of a LC composite device or so and an element of another capacitor or so. The ferrite composition according to the present embodiment may be also used for electronic devices normally using ferrites, such as capacitors.

EXAMPLES

Hereinafter, the present invention will be described based on further detailed examples, but is not limited to the examples.

First, $Fe_2O_3$, NiO, CuO, and ZnO were prepared as raw materials of a main component of a ferrite composition, and $SiO_2$, $Bi_2O_3$, and $Co_3O_4$ were prepared as raw materials of an accessory component of the ferrite composition. Incidentally, the starting materials preferably have an average particle size of 0.1 to 1.0 µm.

Next, powders of the prepared raw materials of the main component and the accessory component were weighed so that sintered bodies having compositions shown in Table 1 were obtained.

After the weighing, the prepared raw materials of the main component were subjected to a wet mixing for 16 hours, and raw material mixtures were obtained.

Next, the obtained raw material mixture was dried and then calcined in the air, and calcined materials were obtained. The calcination temperature was appropriately determined in a range of 500 to 900° C. based on the composition of the raw material mixtures. Thereafter, the calcined materials were pulverized in a ball mill while being added with the raw materials of the accessory component, and pulverized powders were obtained.

Next, after the pulverized powders were dried, 100 pts. wt. of the pulverized powder was added with 10.0 pts. wt. of a polyvinyl alcohol aqueous solution having a concentration of 6 wt % as a binder, and granulated to be a granule. This granule was pressed into a green compact of a toroidal shape (size: outer diameter of 8 mm×inner diameter of 4 mm×height of 2.5 mm) and a green compact of a disc shape (size: diameter 12 mm×height 2 mm).

Next, each of the green compacts was fired at 860 to 900° C., which was equal to or lower than the melting point (962° C.) of Ag, for 2 hours in the air, and toroidal core samples and disc samples as sintered bodies were obtained. Furthermore, each of the samples obtained was subjected to the following characteristic evaluation. Incidentally, a fluorescent X-ray analyzer confirmed almost no change with respect to compositions between the weighed raw material powders and the fired green compacts.

Resistivity ρ

An In—Ga electrode was applied on both surfaces of the disc samples, and DC resistance values were measured to calculate resistivity ρ (unit: Ω·m). The DC resistance values were measured by an IR meter (R8340 manufactured by ADVANTEST CORPORATION). In the present examples, a resistivity ρ of $1.00 \times 10^5$ Ω·m or more was considered to be favorable.

Real Part µ' Complex Permeability

The toroidal core samples were measured with respect to µ' at 10 MHz and µ' at 900 MHz using an RF Impedance/

Material Analyzer (E4991A manufactured by Agilent Technologies) and a test fixture (16454A manufactured by Agilent Technologies). This measurement was conducted at 25° C. In the present examples, a toroidal core whose µ' at 10 MHz was 4.5 or more and µ' at 900 MHz was 5.5 or more was considered to be favorable.

Temperature Characteristics of Permeability

The toroidal core samples were wound by a copper wire with 20 turns and measured with respect to initial permeability $\mu_i$ at room temperature (25° C.) and initial permeability $\mu_i$ at 125° C. Then, a change rate of initial permeability $\mu_i$ at 125° C. based on initial permeability $\mu_i$ at room temperature was calculated. In the present examples, an absolute value of the change rate of $\mu_i$ having 100% or less was considered to be favorable.

Table 1 shows the above test results.

No. 10, Sample No. 22, Sample No. 33, and Sample No. 34), µ' at 900 MHz was decreased.

When the content of $Fe_2O_3$ was too small (Sample No. 5, Sample No. 10, Sample No. 13, and Sample No. 34), µ' at 10 MHz and/or µ' at 900 MHz was/were decreased. When the content of $Fe_2O_3$ was too large (Sample No. 16), resistivity ρ was decreased significantly.

When the content of CuO was too small (Sample No. 17), resistivity ρ was decreased significantly.

NUMERICAL REFERENCES 1, 1a . . . chip coil
2 . . . ceramic layer
3, 3a . . . internal electrode layer
4, 4a . . . chip body

TABLE 1

| Sample No. | $Fe_2O_3$ | NiO | CuO | ZnO | $Co_3O_4$ | $Bi_2O_3$ | $SiO_2$ | Resistivity Ωm | µ' (10 MHz) | µ' (900 MHz) | Temperature change rate of µi % |
|---|---|---|---|---|---|---|---|---|---|---|---|
| | mol % | | | | pts. wt. | | | | | | |
| 1 | 46.2 | 40.4 | 8.8 | 4.6 | 3.2 | 1.0 | 1.1 | 5.2E+06 | 5.5 | 8.0 | 17.5 |
| 2 | 46.4 | 36.4 | 8.7 | 8.5 | 4.8 | 1.0 | 1.1 | 5.2E+06 | 6.4 | 8.9 | 28.9 |
| 3 | 46.1 | 32.8 | 8.8 | 12.3 | 3.2 | 1.0 | 1.1 | 3.4E+07 | 9.8 | 6.0 | 24.4 |
| ✗4 | 45.6 | 25.8 | 8.7 | 19.9 | 2.4 | 0.8 | 1.3 | 2.2E+08 | 15.5 | 5.2 | 27.6 |
| ✗5 | 37.0 | 54.2 | 7.5 | 1.3 | 1.5 | 0.2 | 0.2 | 8.4E+05 | 4.4 | 4.1 | 24.3 |
| ✗6 | 46.3 | 45.3 | 7.0 | 1.4 | 0.2 | 0.2 | 0.2 | 1.3E+06 | 11.3 | 3.4 | 17.6 |
| 7 | 46.5 | 28.5 | 8.8 | 16.2 | 8.0 | 0.8 | 1.1 | 4.2E+06 | 6.3 | 7.9 | 61.4 |
| 8 | 46.1 | 37.2 | 8.5 | 8.2 | 4.8 | 1.0 | 2.2 | 4.6E+06 | 5.6 | 7.8 | 22.7 |
| 9 | 47.4 | 38.4 | 9.4 | 4.8 | 4.8 | 1.0 | 0.2 | 1.9E+06 | 4.7 | 6.2 | 83.2 |
| ✗10 | 40.6 | 28.7 | 7.9 | 22.8 | 0.4 | 0.8 | 4.9 | 1.5E+06 | 8.5 | 5.2 | 3.6 |
| 11 | 46.1 | 23.2 | 8.7 | 22.0 | 3.2 | 0.8 | 1.3 | 6.2E+07 | 16.0 | 5.7 | 38.3 |
| 12 | 46.1 | 29.0 | 8.8 | 16.1 | 3.2 | 0.8 | 1.1 | 7.4E+07 | 12.5 | 5.6 | 31.1 |
| ✗13 | 41.0 | 45.0 | 7.3 | 6.7 | 3.6 | 2.0 | 1.9 | 8.8E+06 | 4.4 | 5.8 | 14.3 |
| 14 | 43.0 | 42.7 | 7.5 | 6.8 | 3.6 | 2.0 | 2.0 | 1.5E+06 | 4.6 | 6.0 | 19.8 |
| 15 | 50.0 | 26.0 | 8.4 | 15.6 | 3.8 | 0.5 | 1.1 | 1.7E+05 | 8.6 | 5.5 | 58.6 |
| ✗16 | 52.0 | 25.2 | 8.0 | 14.8 | 3.4 | 0.5 | 1.1 | 9.7E+04 | 8.4 | 4.4 | 31.8 |
| ✗17 | 48.3 | 38.0 | 3.5 | 10.2 | 3.2 | 0.5 | 1.4 | 8.7E+04 | 5.1 | 7.2 | 40.5 |
| 18 | 51.0 | 35.0 | 5.0 | 9.0 | 5.0 | 3.0 | 1.1 | 7.9E+05 | 6.0 | 8.9 | 59.4 |
| 19 | 46.5 | 27.6 | 14.0 | 11.9 | 3.2 | 0.7 | 1.1 | 6.5E+06 | 8.2 | 6.0 | 57.2 |
| 20 | 46.0 | 26.6 | 15.0 | 12.4 | 3.2 | 0.7 | 1.0 | 3.3E+07 | 8.4 | 6.0 | 65.4 |
| 21 | 46.3 | 45.7 | 7.0 | 1.0 | 3.2 | 1.0 | 0.6 | 1.3E+06 | 4.7 | 6.6 | 54.2 |
| ✗22 | 46.1 | 45.9 | 7.0 | 1.0 | 3.1 | 1.0 | 4.5 | 1.3E+05 | 3.9 | 5.1 | 43.6 |
| 23 | 47.0 | 19.7 | 8.4 | 24.9 | 5.6 | 0.8 | 1.6 | 6.1E+07 | 11.4 | 6.0 | 55.3 |
| 24 | 46.1 | 32.8 | 8.8 | 12.3 | 3.1 | 0.8 | 1.1 | 2.6E+07 | 9.9 | 5.7 | 22.8 |
| 25 | 48.0 | 26.8 | 8.8 | 16.4 | 8.0 | 0.5 | 1.1 | 4.0E+06 | 7.2 | 8.0 | 73.9 |
| ✗26 | 48.0 | 26.8 | 8.8 | 16.4 | 10.0 | 0.5 | 1.1 | 1.9E+06 | 6.0 | 7.9 | 129.3 |
| ✗27 | 46.0 | 29.0 | 8.9 | 16.1 | 5.0 | 0.1 | 1.1 | 9.7E+04 | 7.5 | 5.6 | 83.1 |
| 28 | 46.7 | 28.6 | 8.8 | 15.9 | 5.0 | 0.3 | 1.1 | 3.0E+07 | 11.0 | 6.1 | 51.6 |
| 29 | 46.3 | 36.5 | 8.7 | 8.5 | 4.8 | 5.0 | 1.0 | 1.1E+06 | 6.1 | 9.0 | 18.2 |
| 30 | 46.3 | 36.5 | 8.7 | 8.5 | 4.8 | 8.0 | 1.0 | 3.3E+05 | 6.0 | 9.0 | 43.2 |
| ✗31 | 47.9 | 30.2 | 9.1 | 12.8 | 5.0 | 1.0 | 0.1 | 6.3E+06 | 7.8 | 7.8 | 222.5 |
| 32 | 44.0 | 25.5 | 8.3 | 22.2 | 5.0 | 0.5 | 3.0 | 2.4E+07 | 6.3 | 5.6 | 38.0 |
| ✗33 | 43.0 | 34.5 | 5.0 | 17.5 | 4.0 | 1.0 | 5.0 | 4.0E+05 | 5.0 | 5.4 | 56.0 |
| ✗34 | 40.8 | 28.6 | 7.9 | 22.7 | 6.0 | 0.7 | 5.0 | 2.9E+06 | 4.0 | 4.9 | 28.0 |

✗Comparative Examples

It was confirmed from Table 1 that all of the characteristics were favorable when the contents of the main component and the accessory component were within the ranges of the prevent invention.

When the content of $Co_3O_4$ was too small (Sample No. 4 to Sample No. 6 and Sample No. 10), µ' at 900 MHz was decreased. When the content of $Co_3O_4$ was too large (Sample No. 26), initial permeability $\mu_i$ had a deteriorated temperature characteristic.

When the content of $Bi_2O_3$ was too small (Sample No. 27), resistivity ρ was decreased significantly.

When the content of $SiO_2$ was too small (Sample No. 31), initial permeability $\mu_i$ had a deteriorated temperature characteristic. When the content of $SiO_2$ was too large (Sample 5 . . . terminal electrode
6 . . . terminal connection through-hole electrode
6a . . . leading electrode
30, 30a . . . coil conductor

The invention claimed is:

1. A ferrite composition comprising a main component and an accessory component, wherein
the main component includes:
43.0 to 51.0 mol % of iron oxide in terms of $Fe_2O_3$;
5.0 to 15.0 mol % of copper oxide in terms of CuO;
1.0 to 24.9 mol % of zinc oxide in terms of ZnO; and
a remaining part of nickel oxide, and the accessory component includes:

0.2 to 3.0 pts. wt. of silicon compound in terms of $SiO_2$;

3.1 to 8.0 pts. wt. of cobalt compound in terms of $Co_3O_4$; and 0.3 to 8.0 pts. wt. of bismuth compound in terms of $Bi_2O_3$ with respect to 100 pts. wt. of the main component, the ferrite composition has a resistivity ρ of $1.00 \times 10^5$ Ω·m or more, μ' at 10 MHz of 4.5 or more, μ' at 900 MHz of 5.5 or more, and an absolute value of a change rate of initial permeability $μ_i$ at 125° C. based on initial permeability $μ_i$ at 25° C. of 100% or less.

2. A ferrite sintered body composed of the ferrite composition according to claim 1.

3. An electronic device comprising the ferrite sintered body according to claim 2.

4. A chip coil comprising the ferrite sintered body according to claim 2.

5. The ferrite composition according to claim 1, wherein the main component includes:

46.1 to 51.0 mol % of iron oxide in terms of $Fe_2O_3$;

5.0 to 12.0 mol % of copper oxide in terms of CuO;

2.0 to 22.0 mol % of zinc oxide in terms of ZnO; and a remaining part of nickel oxide, and the accessory component includes:

0.2 to 2.2 pts. wt. of silicon compound in terms of $SiO_2$;

3.1 to 7.0 pts. wt. of cobalt compound in terms of $Co_3O_4$; and 0.30 to 5.0 pts. wt. of bismuth compound in terms of $Bi_2O_3$ with respect to 100 pts. wt. of the main component.

6. A ferrite sintered body composed of the ferrite composition according to claim 5.

7. An electronic device comprising the ferrite sintered body according to claim 6.

8. A chip coil comprising the ferrite sintered body according to claim 6.

9. The ferrite composition according to claim 1, wherein the main component includes:

46.1 to 50.0 mol % of iron oxide in terms of $Fe_2O_3$;

5.5 to 11.0 mol % of copper oxide in terms of CuO;

2.0 to 17.0 mol % of zinc oxide in terms of ZnO; and a remaining part of nickel oxide, and the accessory component includes:

0.2 to 2.0 pts. wt. of silicon compound in terms of $SiO_2$;

3.1 to 7.0 pts. wt. of cobalt compound in terms of $Co_3O_4$; and 0.30 to 5.0 pts. wt. of bismuth compound in terms of $Bi_2O_3$ with respect to 100 pts. wt. of the main component.

10. A ferrite sintered body composed of the ferrite composition according to claim 9.

11. An electronic device comprising the ferrite sintered body according to claim 10.

12. A chip coil comprising the ferrite sintered body according to claim 10.

* * * * *